United States Patent [19]

Esashi

[11] 3,809,219

[45] May 7, 1974

[54] TAPE CASSETTE

[75] Inventor: Hanjiro Esashi, Sendai, Japan

[73] Assignee: Sony Corporation, Tokyo, Japan

[22] Filed: Apr. 14, 1972

[21] Appl. No.: 244,210

[30] Foreign Application Priority Data

Apr. 22, 1971 Japan.............................. 46-31739

[52] U.S. Cl.......... 220/55 K, 206/1.5, 206/DIG. 36, 220/35

[51] Int. Cl.... A47j 27/08, A47j 36/10, B65d 45/00

[58] Field of Search............. 220/35, 55 K; 206/1.5, 206/DIG. 36, 1 R, 52 F; 242/198, 199, 194; 179/100.2 ZA, 100.2 Z

[56] References Cited

UNITED STATES PATENTS

| | | | |
|---|---|---|---|
| 3,672,603 | 6/1972 | Swain | 242/194 |
| 2,535,275 | 12/1950 | Dixon | 220/55 K |
| 3,165,225 | 1/1965 | Reitzel | 220/35 |
| 2,941,741 | 6/1960 | Bilsback | 242/199 |
| 3,215,262 | 11/1965 | Fernandez et al. | 206/1.5 |

*Primary Examiner*—William T. Dixson, Jr.

*Attorney, Agent, or Firm*—Lewis H. Eslinger, Esq.; Alvin Sinderbrand, Esq.

[57] ABSTRACT

In a tape cassette housing having an opening through which magnetic tape contained in the housing can be engaged and withdrawn from the housing, for example, for the recording and/or reproducing of signals on the tape by means of a head assembly outside the cassette, and a pivoted lid for closing such opening; a latch mechanism is provided for locking the lid in its closed position to normally protect the tape, and such latch mechanism is released by an actuating element which is inserted into the cassette housing in the normal course of the positioning of the cassette in the holder therefor of the recording and/or reproducing apparatus. The latch mechanism includes a keeper on the lid disposed within the cassette housing adjacent an edge of the opening when the lid closes such opening, and a latching element slidable rectilinearly in a guide provided at the inside of a wall of the housing and having a latch nose at one end of the latching element engageable with the keeper under the urging of a spring. The housing wall and latch element have adjacent apertures which are normally offset relative to each other and which are brought into registry by the penetration of the actuating element through the wall aperture, whereby to displace the latching element against the force of the spring for relasing the latch nose from the keeper.

12 Claims, 8 Drawing Figures

TAPE CASSETTE

This invention relates generally to tape cassettes for use on tape recording and/or reproducing apparatus, and more particularly is directed to improvements in tape cassettes of the type in which the tape is withdrawn from the cassette housing for engagement with elements, for example, magnetic heads, of the apparatus by which signals are recorded and/or reproduced on the tape.

A tape cassette or cartridge has been proposed, for example, in U.S. Pat. No. 2,941,741, issued June 21, 1960, in which the tape is wound on, and extends between reels rotatably contained within the cassette housing having an opening through which access to the tape between the reels may be had when a pivoted closure section or lid associated with the opening is moved to its opened position, and latch mechanisms are provided for normally locking the lid in its closed position so as to protect the tape within the cassette housing. In the previously proposed tape cassette or cartridge, each latch mechanism is constituted by a latch lever pivotally mounted at the inside of an end wall of the housing and being spring urged to a position in which a nose on the latch lever engages a respective stud on the closure section or lid for holding the latter in its closed position. The latch lever further carries a latch release pin which projects outwardly through an arcuate slot in the adjacent end wall of the cassette housing and which is displaced by a corresponding manipulating member of the tape recording and/or reproducing apparatus when the cassette is moved to its operative position in such apparatus. However, since the latch release pin of each latch mechanism extends to the outside of the cassette housing in the previously proposed arrangement, such latch release pin can be accidentally displaced to release the corresponding latch mechanism and permit opening of the closure section or lid when the cassette is being handled.

Accordingly, it is an object of this invention to provide a tape cassette having an opening through which tape contained in the housing can be withdrawn and a lid for normally closing such opening, with an improved latch mechanism for locking the lid in its closed position, which latch mechanism is automatically released upon the positioning of the cassette in a tape recording and/or reproducing apparatus while preventing inadvertent release of the latch mechanism during normal handling of the cassette.

Another object is to provide a tape cassette, as aforesaid, in which the latch mechanism is releasable by the insertion, into an aperture provided in the cassette housing of an actuating element, and further in which such insertion of the actuating element occurs as a result of the normal positioning of the cassette in or on the recording and/or reproducing apparatus.

Still another object is to provide a tape cassette, as aforesaid, in which the latch mechanism is of simple construction which can be inexpensively produced and assembled and which is ideally suited for the mass production thereof.

In accordance with an aspect of this invention, the latch mechanism for locking the lid in its closed position with respect to the opening of the cassette housing includes a keeper on the lid disposed within the housing adjacent an edge of the opening when the lid is in its closed position, a guide structure disposed at the inside of a wall of the housing and extending longitudinally therealong toward the edge of the opening adjacent the location of the keeper in the closed lid position, a latching element rectilinearly slidable in the guide structure and having a latch nose at one end which is engageable with the keeper in response to the urging of a spring acting on the latching element, the housing wall having a first aperture therein for penetration by the actuating element and across which the latching element extends, and the latching element having a second aperture therein which, with the latch nose engaging the keeper, is offset relative to the first aperture, such aperture in the latching element being adapted to receive the actuating element penetrating the aperture in the housing wall, whereby the latching element is displaced longitudinally against the force of the spring for disengaging the latch nose from the keeper and permitting movement of the lid to its opened position.

The above, and other objects, features and advantages of this invention, will be apparent in the following detailed description of illustrative embodiments thereof which is to be read in connection with the accompanying drawings, wherein.

Figure 1:
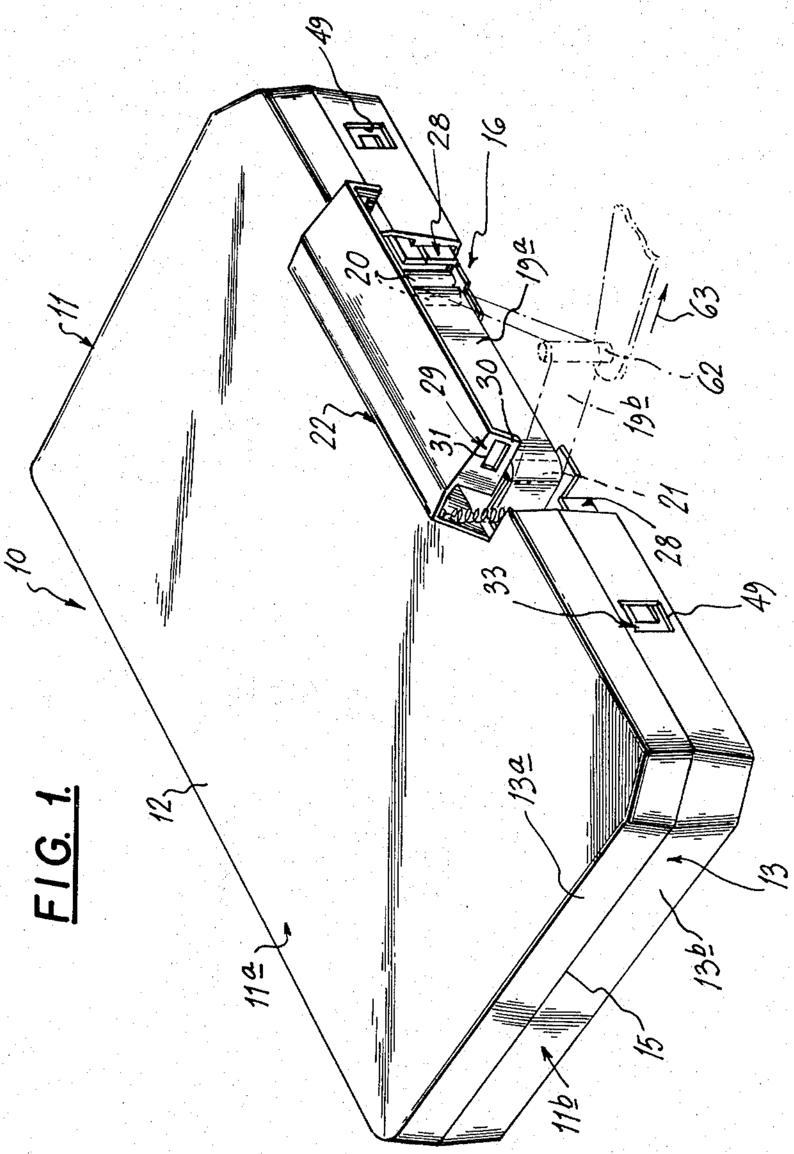
FIG. 1 is a perspective view of a tape cassette in accordance with an embodiment of this invention shown with its lid in the opened position thereof to permit the withdrawal of tape from within the cassette housing by means of a tape engaging member represented in broken lines.
Figure 3:
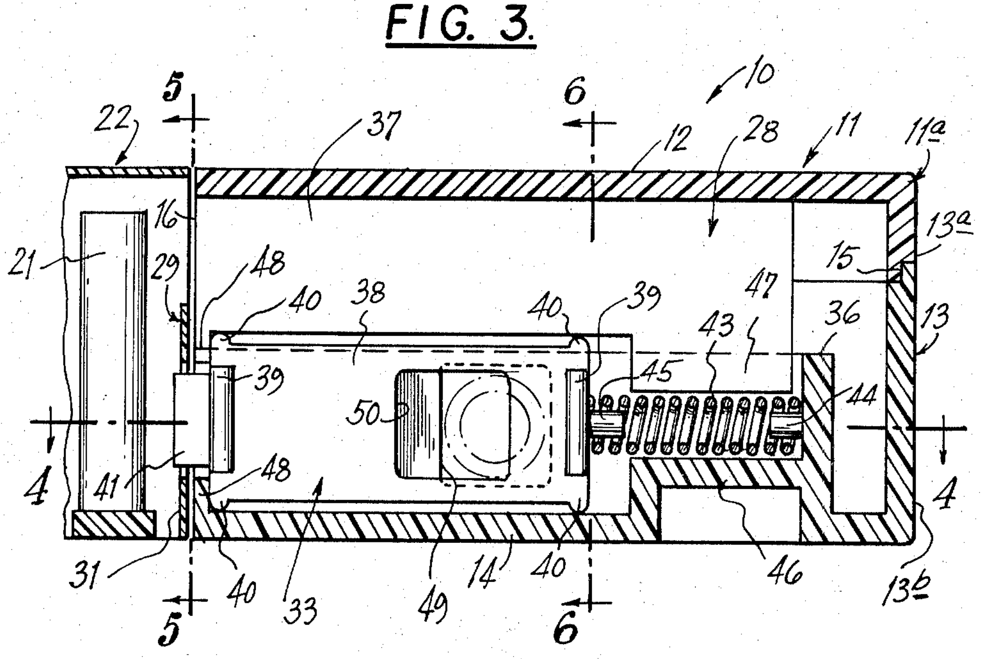
FIG. 3 is a fragmentary, enlarged sectional view taken along the line 3—3 on FIG. 2.
Figure 7:
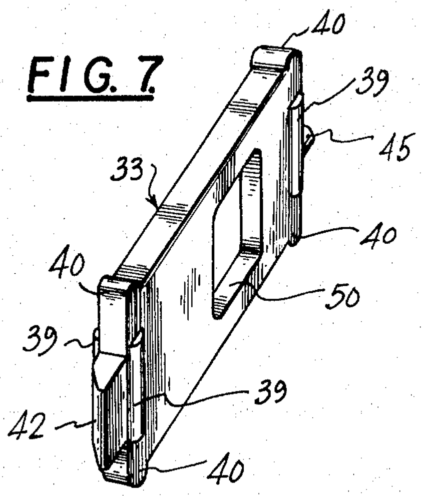
Figure 5:
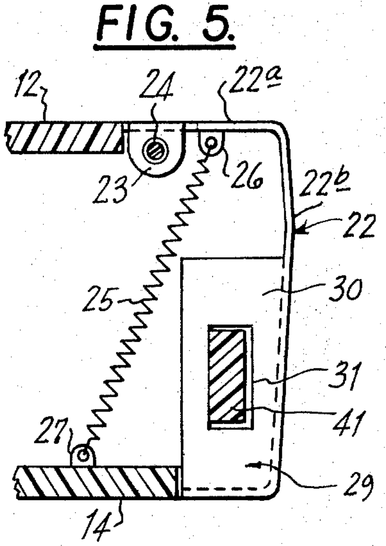
Figure 6:
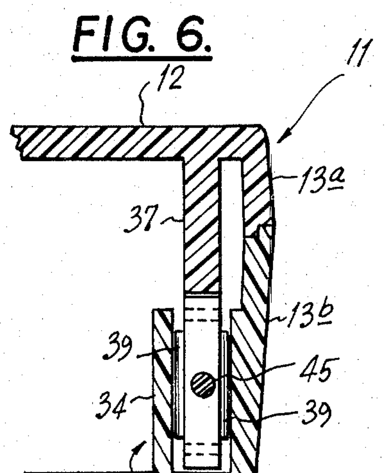
Figure 8:
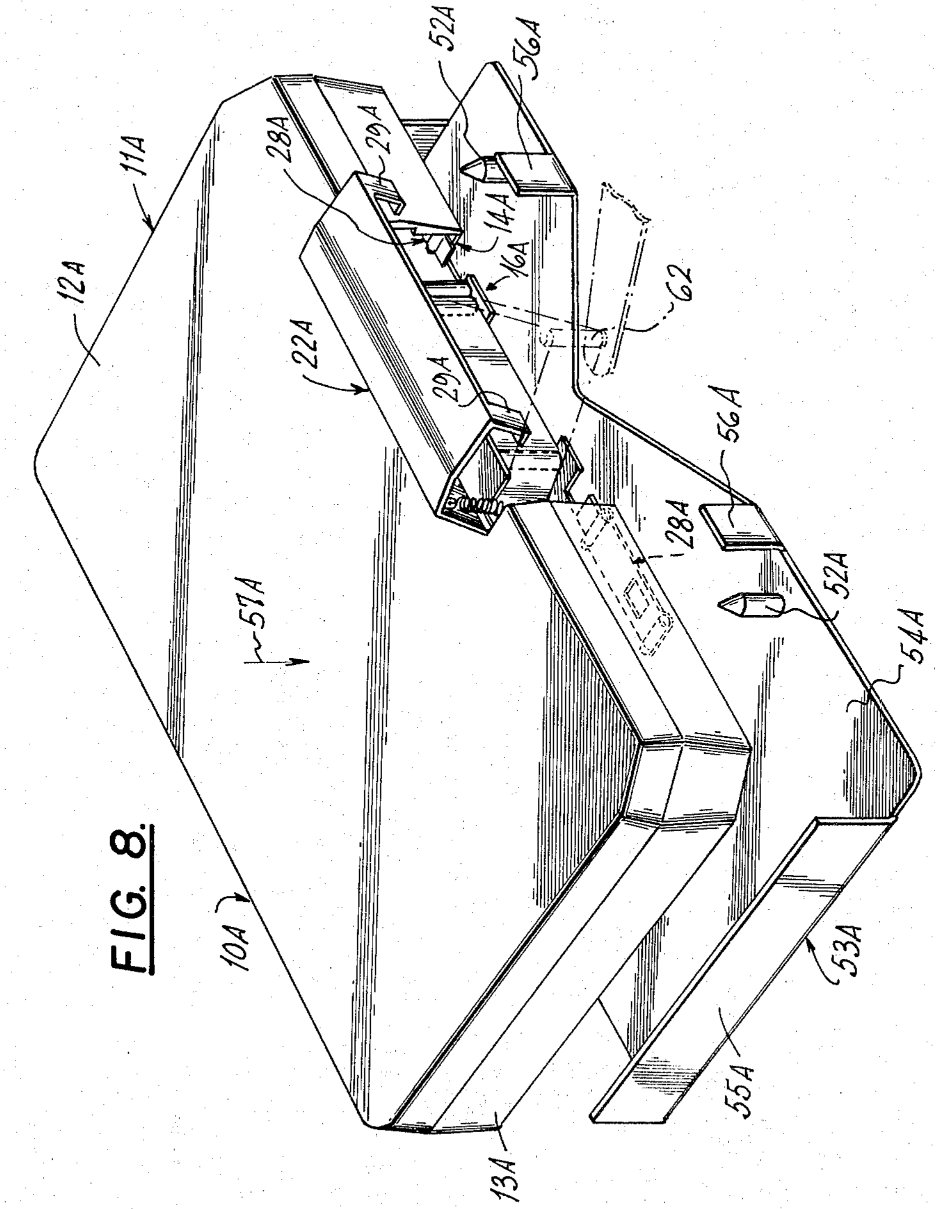

FIGS. 5 and 6 are detail transverse sectional views taken along the lines 5—5 and 6—6, respectively, on FIG. 3;

FIG. 7 is a perspective view of a latching element included in the latch mechanism according to this invention; and FIG. 8 is a perspective view similar to that of FIG. 1, but showing another embodiment of the invention.

Figure 2:
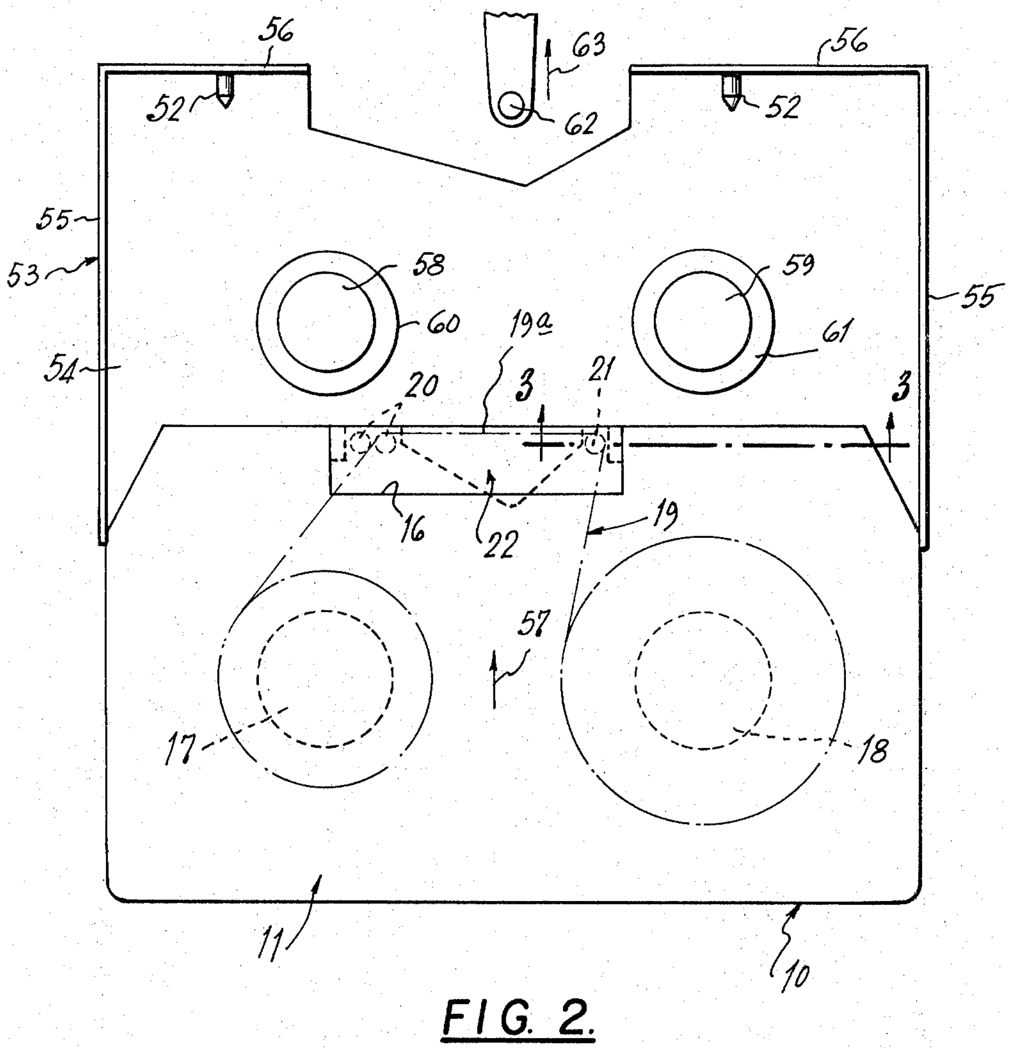
FIG. 2 is a top plan view of the cassette of FIG. 1 shown with the lid thereof in closed position, and illustrating the manner in which the cassette is received by a holder of a magnetic recording and/or reproducing apparatus with which the cassette is to be used.

Referring to the drawings in detail, and initially to FIG. 1 thereof, it will be seen that a tape cassette 10 in accordance with this invention comprises a housing 11 of flat, substantially rectangular configuration which may be formed of a suitable plastic and consists of an upper section 11*a* and a lower section 11*b*. The upper section 11*a* has a substantially flat top wall 12 with a flange 13*a* depending from the margin of top wall 12, and the lower section 11*b* has a bottom wall 14 (FIG. 3) and an upstanding peripheral flange 13*b* which is suitably secured to flange 13*a*, as at a joint 15 (FIG. 3), so that flanges 13*a* and 13*b* cooperate to define a peripheral wall 13 of housing 11. The peripheral wall 13 and adjacent portions of top and bottom walls 12 and 14 are cut away along one relatively long side of rectangular housing 11 to define an elongated opening 16. As shown in broken lines on FIG. 2, rotatable reels 17 and 18 are suitably located within housing 11 and a magnetic tape 19 is wound on reels 17 and 18 and is guided therebetween by guide pins 20 located adjacent one end of opening 16 and a guide pin 21 located adjacent the other end of opening 16. Thus, a run 19*a* of the magnetic tape extending between guide pins 20 and 21 runs along opening 16 and may be engaged and withdrawn from the housing through such opening, as hereinafter described.

A lid 22 is provided for normally closing opening 16 and thereby protecting the tape 19 contained within cassette housing 11 from exposure to dust and from contact with the operator's fingers during handling of cassette 10. The lid 22 which may be stamped or otherwise suitable formed of metal is shown to include an upper portion 22*a* and a depending portion 22*b* (FIG. 5) which respectively correspond in shape to the cutouts in top wall 12 and peripheral wall 13 defining the opening 16. In order to pivotally attach lid 22 to housing 11 for swinging between the opened position shown on FIG. 1 and the closed position shown on FIG. 5, apertured ears 23 may be provided at the opposite ends of top portion 22*a* of lid 22 for receiving pins 24 that project from top wall 12 into the opposite ends of opening 16 (FIG. 5). The lid 22 is preferably resiliently urged to either its opened or closed position. For example, as shown on FIG. 5, a tension spring 25 may be connected at its opposite ends to anchors 26 and 27 provided on the top portion 22*a* of the lid and on bottom wall 14, respectively, for urging the lid to its closed position.

Figure 4:
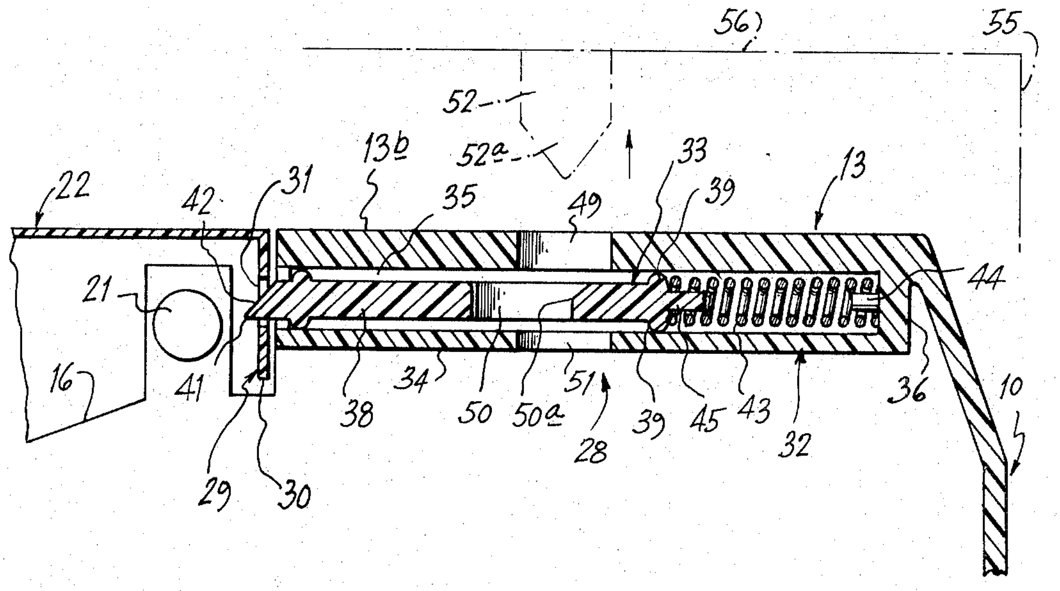
FIG. 4 is a sectional view taken along the line 4—4 on FIG. 3.

At least one latch mechanism 28 is provided within housing 11 for releasably locking lid 22 in its closed position. If desired, as shown, two latch mechanisms 28 may be associated with the opposite ends of lid 22. In accordance with this invention, each latch mechanism 28 includes a keeper 29 which, in the embodiment being described, is constituted by a tab 30 extending at right angles from an end of lid portion 22*b* adjacent the free edge of the latter and having a slot 31. It will be seen that, when lid 22 is in its closed position, keeper 29 is disposed within housing 11 adjacent an end edge of opening 16 (FIGS. 3 and 4). The latch mechanism 28 according to this invention is further shown to comprise a guide structure 32 disposed at the inside of one of the walls of housing 11 and extending longitudinally along such wall toward the end edge of opening 16 to which keeper 29 is adjacent in the closed lid position, and a latching element 33 which is rectilinearly or longitudinally slidable in the guide structure 32 and engageable with keeper 29, as hereinafter described, for locking the lid in its closed position.

In the embodiment of the invention illustrated by FIGS. 1–6, the guide structure 32 is shown to include a partition 34 directed upwardly from bottom wall 14 and extending parallel to, and spaced inwardly from flange 13*b* along the portion of the latter at one side of opening 16 (FIGS. 4 and 6). The partition 34 cooperates with the adjacent portion of flange 13*b* to define a channel 35 therebetween which opens upwardly along the length of the channel and which opens at one end toward lid 22 while the opposite end of channel 35 is closed by an end wall 36 (FIGS. 3 and 4) extending between partition 34 and flange 13*b*. The guide structure 32 is further shown to include a flange 37 (FIGS. 3 and 6) depending from top wall 12 along channel 35 and located intermediate partition 34 and flange 13*b* when the sections 11*a* and 11*b* of the cassette housing are assembled together.

The latching element 33 (FIG. 7) is shown to preferably include an elongated flat plate 38 fitting loosely in channel 35 and preferably having rounded projections 39 projecting laterally from opposite sides of plate 38 adjacent the opposite ends of the latter and rounded projections 40 projecting upwardly and downwardly from the upper and lower edges, respectively, of plate 38, also adjacent the opposite ends of the latter. Thus, when latching element 33 is disposed in channel 35, the rounded projections 39 are engageable with the opposite side surfaces of channel 35 and the rounded projections 40 are engageable with the bottom surface of the channel and with the bottom edge of flange 37 at relatively small areas of contact therewith for minimizing the frictional resistance to movement of latching element 33 along channel 35. A latch nose 41 projects from the end of plate 38 which is directed toward opening 16 and is adapted to extend from channel 35 into slot 31 of keeper 29 for locking lid 22 in its closed position. The nose 41 preferably has a beveled face 42 at its outwardly directed side so that, upon closing of lid 22, keeper 29 will cam on beveled face 42 to urge latching element 33 longitudinally into channel 35, that is, toward the right from the position shown on FIG. 4, until lid 22 is in its closed position at which slot 31 of the keeper registers with nose 41 to receive the latter. The latching element 33 is urged longitudinally to its operative position in which nose 41 projects from channel 35, as shown on FIGS. 3 and 4, by means of a helical compression spring 43 which is disposed in channel 35 between the end wall 36 thereof and the adjacent end of plate 38. Spring 43 is preferably positioned by means of studs 44 and 45 which project from end wall 36 and from the adjacent end of plate 38 and which are received in the adjacent end portions of the helical spring. Further, as shown on FIG. 3, the helical spring 43 is preferably maintained with its axis in a straight line between a raised bottom portion 46 of channel 35 and the lower edge of a depending end portion 47 of flange 37. In order to limit the longitudinal movement of latching element 33 under the urging of spring 43 to the operative position shown on FIGS. 3 and 4, the guide structure 32 preferably has abutments 48 directed into channel 35 at the end of the latter adjacent opening 16 and being engageable with the adjacent end of plate 38. It will be apparent that, with the above described construction, the urging of latching element 33 by spring 43 causes nose 41 of the latching element to engage in slot 31 of the adjacent keeper 29 when lid 22 is in its closed position, whereby to lock the lid in the closed position.

In order to effect release of nose 41 of latching element 33 from keeper 29 for permitting pivotal movement of lid 22 to its opened position shown on FIG. 1, the latch mechanism 28 according to this invention is provided with an aperture 49 in the wall of housing 11 along which latching element 33 is movable in guide structure 32. Thus, in the embodiment illustrated in FIGS. 1–6, the aperture 49 is formed in peripheral wall 13, and such aperture 49 is located in the respective housing wall so that the plate 38 of latching element 33 will extend across aperture 49 in the operative position of latching element 33 (FIGS. 3 and 4) and also in the released position of the latching element, that is, when the latter is displaced toward the right, as viewed on FIGS. 3 and 4, so as to retract its nose 41 into channel 35. Further, as shown, the plate 38 of latching element 33 has an aperture 50 therein which, in the operative position of the latching element (FIGS. 3 and 4) is offset relative to aperture 49 in the direction toward opening 16, that is, in the direction toward the open end of channel 35. The edge of aperture 50, at least at the side thereof remote from nose 41 of latching element 33, preferably has a bevel 50*a* facing toward the adjacent wall 13 (FIG. 4). Further, the partition 34 is preferably provided with an aperture or opening 51 which is registered or aligned with the aperture 49 in peripheral wall 13 at the opposite side of channel 35.

It will be seen that the above described latch mechanism 28 in accordance with this invention is adapted to be released simply by the insertion in aperture 49 of an actuating element 52 which, upon penetration of aperture 49 acts upon the edge 50*a* of aperture 50 for longitudinally displacing latching element 33 against the force of spring 43, that is, toward the right as viewed on FIG. 4, so as to bring aperture 50 into registration with aperture 49 and to retract nose 41 into channel 35, whereby such nose is released from keeper 29 to permit pivoting of lid 22 to its open position. The actuating element 52, as shown, may be in the form of a pin which preferably has a conical or rounded tip 52*a*.

In a magnetic recording and/or reproducing apparatus intended for use with tape cassettes according to this invention, the actuating element 52 for releasing the latch mechanism 28 of each cassette is preferably mounted on the apparatus so as to penetrate or extend through the respective aperture 49 of the cassette housing 11 in response to the positioning of the cassette 10 on the apparatus. For example, as shown on FIG. 2, a magnetic recording and/or reproducing apparatus intended for use in connection with the cassette 10 embodying this invention may have a cassette holder 53 constituted by a platform 54 having guide flanges 55 along its opposite side edges and stop flanges 56 along portions of its rear edge. The cassette 10 is positioned in holder 53 by disposing the opening 16 of cassette housing 11 at the rear thereof and by sliding the cassette rearwardly in the direction of the arrow 57 between flanges 55 until the cassette comes in contact with stop flanges 56. With a holder adapted to receive the cassette 10 in the foregoing manner, the actuating element 52 for releasing each latch mechanism 28 of cassette 10 is mounted on one of the stop flanges 56 so as to extend forwardly therefrom. Thus, when the cassette housing comes in contact with stop flanges 56, each actuating element 52 projects into cassette housing 11 through the respective aperture 49 and releases the respective latch mechanism 28 so that the lid 22 can then be pivoted to its opened position. After the cassette 10 has been thus positioned in holder 53 and has had its latch mechanisms 28 released by the respective actuating elements 52, the holder 53 may be moved downwardly to cause reel support and drive members 58 and 59 to project upwardly through openings 60 and 61 in platform 54 and corresponding openings in the bottom wall of cassette housing 11 for engagement with reels 17 and 18, respectively. Such downward movement of holder 53 may further cause a tape engaging member 62 to enter cassette housing 11 through the uncovered opening 16 at the back of the housing. Thus, when tape engaging member 62 is thereafter displaced rearwardly in the direction of the arrow 63 on FIGS. 1 and 2, the tape engaging member withdraws the tape between reels 17 and 18 from the cassette housing through the opening 16, for example, as indicated at 19*b* on FIG. 1.

In the tape cassette 10 of FIGS. 1–6, the latch mechanisms 28 are positioned against the peripheral wall 13 so as to be releasable by the actuating elements 52 in response to the horizontal sliding of the cassette onto holder 53, as described above, however, the positioning of the latch mechanisms in accordance with this invention depends upon the direction in which the cassette is moved into the cassette holder. Thus, for example, as shown on FIG. 8, a tape cassette 10A in accordance with another embodiment of this invention may be provided for use in connection with a magnetic recording and/or reproducing apparatus having a cassette holder 53A onto which the cassette is moved in a vertically downward direction, as indicated by the arrow 57A. When the cassette 10A is intended to be moved downwardly onto the platform 54A of holder 53A between the locating flanges 55A and 56A, the latch mechanisms 28A, which are otherwise similar to the previously described latch mechanisms 28, are provided against the bottom wall 14A of the cassette housing 11A adjacent the opposite ends of the cassette opening 16A. Further, in the arrangement shown on FIG. 8, the actuating elements 52A for the latch mechanisms 28A project upwardly at suitable locations on platform 54A so that, in response to the downward movement of the cassette onto the holder 53A, actuating elements 52A penetrate corresponding apertures in the bottom wall 14A to effect the release of the latch mechanisms 28A from the keepers 29A provided on lid 22A.

From the foregoing, it will be apparent that, whether the cassette is horizontally slidable onto the cassette holder, as in FIGS. 1–6, or is movable vertically downward onto the cassette holder, as in FIG. 8, the movement of the cassette onto the respective holder causes entry of the actuating elements 52 or 52A into the cassette housing, and such entry causes release of the latch mechanism 28 or 28A. Thus, the release of the latch mechanisms for permitting opening of the lid 22 or 22A is simply effected in all cases. It is also apparent that, when the cassette 10 or 10A is removed from the respective magnetic recording and/or reproducing apparatus, the latch mechanisms 28 or 28A of the cassette for locking the lid 22 or 22A in its closed position are fully contained within the cassette housing so that there is no possibility of inadvertently effecting the release of the latch mechanisms by mere handling of the cassette.

It is further to be seen that latch mechanisms in accordance with this invention are particularly suited for mass production in that, for example, the latching element 33 of each latch mechanism 28 can be conveniently molded of a suitable plastic while the guide structure 32 for the latching element has its several parts molded integrally with the top and bottom sections 11*a* and 11*b* of the cassette housing 11. Further, in assembling the latch mechanism 28, the latching element 33 and spring 43 can be simply installed in the channel 35 prior to the assembling together of the housing sections 11*a* and 11*b* and, after such assembly, the flange 37 on the upper housing section automatically acts to retain latching element 33 and spring 43 within channel 35.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A tape cassette comprising top, bottom and peripheral walls defining a housing for containing a tape and having an elongated opening through which the tape can be engaged and withdrawn from the housing; a lid pivoted on said housing and being movable between opened and closed positions with respect to said opening; and a latch mechanism for said lid including a keeper fixed on said lid so as to be disposed within said housing adjacent an end of said opening in said closed position of the lid, guide means disposed at the inside of one of said walls of the housing and extending longitudinally along said one wall toward said end of the opening adjacent the location of said keeper in said closed lid position, a latching element rectilinearly slidable in said guide means and having a latch nose extending from an end of said latching element directed toward said end of the opening, spring means acting on said latching element to urge the latter longitudinally along said guide means toward said end of the opening to an operative position at which said nose projects from said guide means for locking engagement with said keeper in said closed lid position, said one wall having a first aperture therein for penetration by an actuating element and across which said latching element extends, and said latching element having a second aperture therein which, in said operative position of said latching element, is offset relative to said first aperture in the direction toward said end of the opening so that an adjacent portion of said latching element partly obstructs said first aperture, said second aperture being adapted to receive the actuating element penetrating said first aperture and acting against said portion of the latching element for registering said first and second apertures and thereby displacing said latching element longitudinally against the force of said spring means so as to disengage said latch nose from said keeper and permit movement of the lid to said opened position.

2. A tape cassette according to claim 1, further comprising additional spring means urging said lid to one of said positions thereof.

3. A tape cassette according to claim 2, in which said additional spring means urges said lid to said closed position.

4. A tape cassette according to claim 2, in which said additional spring means urges said lid to said opened position.

5. A tape cassette according to claim 1, in which said guide means includes a partition extending parallel to, and spaced inwardly from said one wall to define a channel therebetween in which said latching element is longitudinally slidable.

6. A tape cassette according to claim 5, in which said partition has an aperture aligned with said first aperture in said one wall for receiving the actuating element when the latter penetrates said first aperture and extends through said second aperture.

7. A tape cassette according to claim 5, in which said latching element is of an elongated flat configuration fitting loosely in said channel and having projections extending therefrom for guiding engagement with surfaces of said channel at relatively small areas of contact, whereby to minimize the frictional resistance to movement of said latching element.

8. A tape cassette according to claim 7, in which said guide means has abutment means directed into said channel and engageable by the latching element for limiting the movement of said latching element by said spring means at said operative position.

9. A tape cassette according to claim 5, in which said spring means is disposed in said channel between the end of said latching element remote from said nose and the adjacent end of said channel.

10. A tape cassette according to claim 5, in which said one wall is said peripheral wall of the housing, said peripheral wall is defined by joined together flanges extending from said top and bottom walls, respectively, said partition extends from one of said top and bottom walls, and the other of said top and bottom walls has an inner flange extending therefrom into said channel for holding said latching element in the channel.

11. A tape cassette according to claim 1, in which said one wall of the housing is one of said top and bottom walls thereof.

12. A tape cassette according to claim 1, in which said portion of the latching element adjacent said second aperture has a bevelled edge facing toward said one wall for engagement by the actuating element penetrating said first aperture.

* * * * *